US007606803B2

United States Patent
Bou-Ghannam et al.

(10) Patent No.: US 7,606,803 B2
(45) Date of Patent: Oct. 20, 2009

(54) METHOD AND SYSTEM FOR DYNAMIC CREATION OF SERVICE FLOWS

(75) Inventors: Akram A. Bou-Ghannam, Lake Worth, FL (US); Thomas E. Creamer, Boca Raton, FL (US); Neil A. Katz, Parkland, FL (US); Victor S. Moore, Lake City, FL (US)

(73) Assignee: International Business Machines Corporation, Armonk, NY (US)

( * ) Notice: Subject to any disclaimer, the term of this patent is extended or adjusted under 35 U.S.C. 154(b) by 418 days.

(21) Appl. No.: 11/023,930

(22) Filed: Dec. 28, 2004

(65) Prior Publication Data
US 2006/0143229 A1 Jun. 29, 2006

(51) Int. Cl.
G06F 7/00 (2006.01)
(52) U.S. Cl. .............................. 707/10; 707/100; 705/1; 705/26
(58) Field of Classification Search .................. 707/10, 707/100–102, 104.1, 9; 709/203, 219, 224–229, 709/232; 705/2, 35, 40, 1, 26; 717/136
See application file for complete search history.

(56) References Cited

U.S. PATENT DOCUMENTS

| | | | | |
|---|---|---|---|---|
| 7,506,072 | B2 * | 3/2009 | Waldorf et al. .............. | 709/249 |
| 2003/0004746 | A1 * | 1/2003 | Kheirolomoom et al. | |
| 2003/0055868 | A1 * | 3/2003 | Fletcher et al. | |
| 2003/0182624 | A1 * | 9/2003 | Large | |
| 2003/0191677 | A1 * | 10/2003 | Akkiraju et al. | |
| 2003/0226107 | A1 * | 12/2003 | Pelegri-Llopart et al. | |
| 2004/0015564 | A1 * | 1/2004 | Williams | |
| 2004/0030674 | A1 * | 2/2004 | Nagano et al. | |

(Continued)

FOREIGN PATENT DOCUMENTS

WO     WO 2004/027548 A2 *   4/2004

OTHER PUBLICATIONS

"On Demand Web Services-Based Business Process Composition"—Liang-Jie Zhang, Bing Li, Tian Chao & Henry Chang—Systems, Man and Cybernetics, 2003 IEEE International Conference date: Oct. 5-8, 2003 vol. 4, pp. 4057-4064.*

(Continued)

Primary Examiner—Jean B. Fleurantin
Assistant Examiner—Anh Ly
(74) Attorney, Agent, or Firm—Novak Druce + Quigg LLP

(57) ABSTRACT

A method (50) of dynamic creation of service flows includes exposing (51) a flow of a service being built to other service providers in a network, soliciting (52) for modification of at least a portion of the flow, and selectively enabling (56) other service providers to modify at least a portion of the flow. The step of soliciting can optionally include advertising (53) BPEL files to indicate flows or portions of flow that are modifiable by other services providers and tagging (54) such BPEL files to indicate such modifiable or reusable portions of the flow. The BPEL files can also be published (55) in a UDDI-like directory. New flows can be created by incorporating (57) the modifications into at least a portion of the flow. Optionally, solicitations for modifications can be removed (59) once the new flow is created.

6 Claims, 2 Drawing Sheets

U.S. PATENT DOCUMENTS

| | | | |
|---|---|---|---|
| 2004/0030740 A1* | 2/2004 | Stelting | |
| 2004/0088713 A1* | 5/2004 | Myllymaki et al. | |
| 2004/0098311 A1* | 5/2004 | Nair et al. | 705/26 |
| 2004/0133515 A1* | 7/2004 | McCoy et al. | 705/40 |
| 2004/0143546 A1* | 7/2004 | Wood et al. | 705/40 |
| 2004/0207659 A1* | 10/2004 | Goodman et al. | |
| 2004/0220910 A1* | 11/2004 | Zang et al. | 707/3 |
| 2004/0237042 A1* | 11/2004 | Murray et al. | 715/530 |
| 2005/0027843 A1* | 2/2005 | Bozak et al. | 709/223 |
| 2005/0080914 A1* | 4/2005 | Lerner et al. | 709/230 |
| 2005/0086297 A1* | 4/2005 | Hinks | 709/203 |
| 2005/0096960 A1* | 5/2005 | Plutowski et al. | 705/8 |
| 2005/0097224 A1* | 5/2005 | Chen et al. | 709/246 |
| 2005/0182768 A1* | 8/2005 | Waldorf et al. | 707/10 |
| 2005/0251501 A1* | 11/2005 | Phillips et al. | 707/2 |
| 2005/0251527 A1* | 11/2005 | Phillips et al. | 707/101 |
| 2005/0251533 A1* | 11/2005 | Harken et al. | 707/104.1 |
| 2005/0256892 A1* | 11/2005 | Harken | 707/101 |
| 2006/0004802 A1* | 1/2006 | Phillips et al. | 707/101 |
| 2006/0015353 A1* | 1/2006 | Reese | 705/1 |
| 2006/0031225 A1* | 2/2006 | Palmeri et al. | 707/10 |
| 2006/0074915 A1* | 4/2006 | Bhandarkar et al. | 707/9 |
| 2006/0095274 A1* | 5/2006 | Phillips et al. | 705/1 |
| 2006/0106748 A1* | 5/2006 | Chafle et al. | 707/1 |
| 2007/0038756 A1* | 2/2007 | Waldorf et al. | 709/227 |

OTHER PUBLICATIONS

"Executing Abstract Web Process Flows"—Akkiraju et al.—Proc. 14th International Conference on Automated Planning and Scheduling, 2004—Citeseer (pp. 1-7).*

"On Accommodating inter service Dependencies in web process flow composition"—Verma et al.—2004 AAAI Spring Symposium Series, 2004—aaai.org (p. 1-7).*

U.S. Appl. No. 11/006,799, Fiammante, et al.*

* cited by examiner

50

```
┌─────────────────────────────────────────────────────────────┐
│ Expose at Least a Portion of a Flow of a Service Being Built to │
│         Other Service Providers in a Network                │
│                                                          51 │
└─────────────────────────────────────────────────────────────┘
                              ↓
┌─────────────────────────────────────────────────────────────┐
│    Solicit for Modification of at Least the Portion of the Flow │
│               By Other Service Providers                    │
│                                                          52 │
└─────────────────────────────────────────────────────────────┘
                              ↓
┌─────────────────────────────────────────────────────────────┐
│      Advertise BPEL Files for the Portion of the Flow That  │
│         Can be Modified by Other Service Providers          │
│                                                          53 │
└─────────────────────────────────────────────────────────────┘
                              ↓
┌─────────────────────────────────────────────────────────────┐
│    Tagging the BPEL File to Indicate Portions of the Flow Which are │
│   Available for Reuse or Modification by the Other Service Providers │
│                                                          54 │
└─────────────────────────────────────────────────────────────┘
                              ↓
┌─────────────────────────────────────────────────────────────┐
│           Publish the BPEL Files in a Universal Description, │
│       Discovery, and Integration (UDDI-Like) Directory      │
│                                                          55 │
└─────────────────────────────────────────────────────────────┘
                              ↓
┌─────────────────────────────────────────────────────────────┐
│  Selectively Enable Modifications of at Least the Portion of the Flow │
│            Modifiable by Other Service Providers            │
│                                                          56 │
└─────────────────────────────────────────────────────────────┘
                              ↓
┌─────────────────────────────────────────────────────────────┐
│      Create a New Flow by Incorporating the Modifications   │
│             Into at Least the Portion of the Flow           │
│                                                          57 │
└─────────────────────────────────────────────────────────────┘
                              ↓
┌─────────────────────────────────────────────────────────────┐
│   Create a New Flow by Using at Least a Portion of the Flow │
│     and At Least a Portion of the Modifications to the Flow │
│                                                          58 │
└─────────────────────────────────────────────────────────────┘
                              ↓
┌─────────────────────────────────────────────────────────────┐
│  Remove Any Solicitation for Modification Once the New Flow is Created │
│              Incorporating the Modifications                │
│                                                          59 │
└─────────────────────────────────────────────────────────────┘
                              ↓
┌─────────────────────────────────────────────────────────────┐
│              Deploy the New Flow as a New Service           │
│                                                          60 │
└─────────────────────────────────────────────────────────────┘
```

FIG. 2

METHOD AND SYSTEM FOR DYNAMIC CREATION OF SERVICE FLOWS

BACKGROUND OF THE INVENTION

1. Technical Field

This invention relates to the field of developing service oriented architecture applications, and more particularly to a method and system for dynamically creating web services.

2. Description of the Related Art

Service Oriented Architecture (SOA) allows a software programmer to model programming solutions in terms of services offered by components to anyone and to anywhere over a network. Services development tools (such as WebSphere Studio Application Developer (WSAD)) are based on the service and process (flow) programming model. The service is the key element in the architecture that binds everything together. The service is implemented by an end-point (a business application), and is described by a Web Services Definition Language (WSDL) file. The process implements a new business service, and makes use of existing services in its implementation. The process implementation can also include other processes.

The process for developing SOA applications usually involves the following steps:

1. Create the services desired for use. Turn existing assets into services, (make them reusable), or create new services from scratch.

2. Create a business process. A business process is a way of bringing all the separately built services together. A process makes a new service out of a collection of services. A build-time tool like the process editor in WSAD-IE can be used to build the business process.

3. Create the services that a service provider would want to offer. Now that a process service is created in which all of the previous services had been combined into another service, the service needs to be deployed, or packaged into a file that can be put onto an application server.

A process service is typically constructed from various services choreographed in a business process flow. Typically, the process-based service is packaged, deployed and offered to service consumers as one encapsulated service described by a WSDL file and without visibility to the internal flow composition of the service.

With the current art, all of the steps listed above are done at build-time using build-time tools like WSAD. Existing tools fail to enable the dynamic and real-time development of new web services or collaboration among service providers in a real meaningful way. A business application system that implements a service in a flow might not be known at build-time and existing tools fail to allow the tool to select and bind to business application systems in real-time and fail to fill the gaps in flow nodes where binding to an end-point is not yet completed. Nor do existing systems provide the knowledge of which portion of flows are modifiable and reusable by other service providers.

SUMMARY OF THE INVENTION

Embodiments in accordance with the invention can enable a method and system for development of new services dynamically in real-time in a more collaborative fashion among service providers. All or portions of a flow for a service can be made visible to other service providers and an indication can be further provided as to which portions of the flow are modifiable by the other service providers. Other service providers can examine the flow and decide to modify the flow by using existing portions of the flow and augmenting the flow with their own additional flow components. A new flow can be created to solve a different business problem while using portions of an originally advertised flow.

In a first aspect of the invention, a method of dynamic creation of service flows can include the steps of exposing at least a portion of a flow of a service being built to other service providers in a network, soliciting for modification of at least the portion of the flow by other service providers, and selectively enabling modifications of at least the portion of the flow modifiable by other service providers. The method can further include the step of creating a new flow by incorporating the modifications into at least the portion of the flow. The new flow can be created by using at least a portion of the flow and at least a portion of the modifications to the flow. The method can then deploy the new flow as a new service. Optionally, the method can further remove any solicitation for modification once the new flow is created incorporating the modifications. Note, the step of soliciting can include the step of advertising Business Process Execution Language (BPEL) files or tags for the portion of the flow that can be modified by other service providers and can further include the step of tagging the BPEL file to indicate portions of the flow which are available for reuse or modification by the other service providers. Further note that the step of soliciting can also include the step of publishing the BPEL files in a Universal Description, Discovery, and Integration (UDDI)-like directory.

In a second aspect of the invention, a system for dynamically creating a service flow using a network of service providers can include a processor coupled to the network of service providers. The processor can be programmed to expose at least a portion of a flow of a service being built to other service providers in the network, to solicit for modification of at least the portion of the flow by other service providers, and to selectively enable modifications of at least the portion of the flow modifiable by other service providers. The processor can be further programmed to enable the creation of new flows by using at least a portion of the flow and at least a portion of the modifications to the flow and to deploy the new flow as a new service. The processor can be further programmed to solicit by advertising BPEL files for the portion of the flow that can be modified by other service providers and to tag the BPEL file to indicate portions of the flow which are available for reuse or modification by the other service providers. The processor can be further programmed to solicit by publishing the BPEL files in a Universal Description, Discovery, and Integration (UDDI)-like directory.

In a third aspect of the invention, a computer program has a plurality of code sections executable by a machine for causing the machine to perform certain steps as described in the method and systems outlined in the first and second aspects above.

BRIEF DESCRIPTION OF THE DRAWINGS

There are shown in the drawings various embodiments, it being understood, however, that the invention is not limited to the precise arrangements and instrumentalities shown.

FIG. 2 is a flow chart illustrating a method for dynamically creating a service flow in accordance with an embodiment of the present invention.

DETAILED DESCRIPTION OF THE INVENTION

Figure 1:
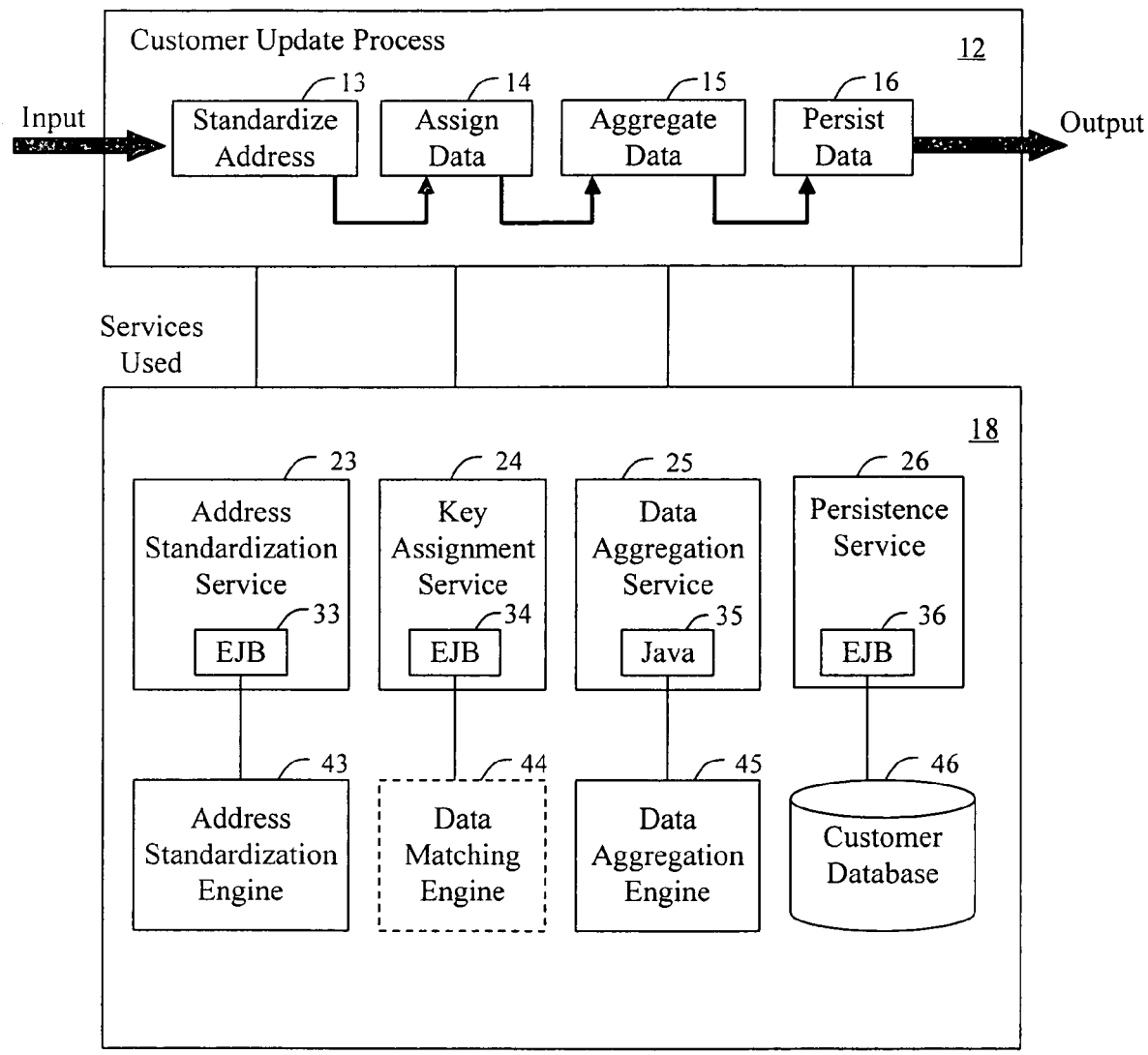
FIG. 1 is a diagram that illustrates a service and process programming model used in conjunction with a system for dynamically creating a service flow in accordance with an embodiment of the present invention.

A flow can be represented in Business Process Execution Language (BPEL) using BPEL tags. A WSDL file describing a Process Service contains BPEL tags or files. BPEL extends WSDL with the introduction of BPEL4WS (Business Process Execution Language for Web Services). Furthermore, the flow composition of a service can be made visible to other service providers. In this regard, a service that implements a process id can be described by a WSDL file to the outside world, but the process portion of the service is described via the BPEL tags. Note, portions or all of the BPEL tags of its WSDL file can be exposed to outside service providers. For example, by making the flow visible, a service provider can advertise the whole flow or parts of it with associated services for use by other service providers. Another service provider that examines the flow can decide to modify the flow by using existing portions of the flow and augment it with their own additional flow components. The new flow created can solve a different business problem while using portions of the originally advertised flow. Thus, embodiments herein can advertise the internal flows of a service and allow other service providers to create new flows from the originally advertised flow.

Note, BPEL4WS provides a language for the formal specification of business processes and business interaction protocols. By doing so, it extends the Web services interaction model and enables it to support business transactions. BPEL4WS defines an interoperable integration model that may facilitate the expansion of automated process integration in both the intra-corporate and the business-to-business spaces. BPEL compositions rely heavily on WSDL descriptions of the involved services in order to refer to the messages being exchanged, the operations being invoked, and the port-Types these operations belong to.

In an example scenario in reference to FIG. 1, a flow diagram illustrates a system 10 where a service is being built allowing various sources to update a customer information database 46 for an enterprise. A requirement can be that customer data from the various sources must be persisted in the enterprise customer database in a uniform manner as illustrated in the customer update process flow 12. To ensure data quality, validity, and integrity, the data must be standardized, matched, and aggregated before updating the customer data store. The process flow 12 depicting the activities of standardizing an address 13, assigning or matching 14, aggregating 15 and updating 16 is shown in FIG. 1. Each activity in the process flow invokes a respective service (23, 24, 25, or 26) among services used 18, and the service is implemented by an endpoint application respectively such as services 43, 44, 45, or 46. For example, the Standardize Address activity 13 invokes an Address Standardization Service 23, and the address standardization function is implemented by an Address Standardization Engine 43. A portion of the process flow 12 can be tagged as being not only visible to other service providers, but also modifiable and shared with other service providers.

In the example scenario of FIG. 1, an assumption that when building this service all the components shown in FIG. 1 are fixed and non-modifiable except for the key assignment 14 portion of the flow 12 corresponding to the Data Matching Engine 44. Thus, in this implementation, the Key Assignment Service 24 and/or Data Matching Engine can be tagged and advertised as being modifiable or available for reuse by other service providers. Each service provider can then modify this portion of the flow for their own tailored business purposes to enable the use of the system or framework 10 to dynamically build a desired service in real-time. In this regard, Business Process Execution Language (BPEL) files or tags can advertise all or the portion of the flow that can be modified by other service providers. The BPEL files or tags can also be tagged to indicate portions of the flow which are available for reuse or modification by the other service providers. Further note that the BPEL files or tags can be published in a Universal Description, Discovery, and Integration (UDDI)-like directory.

Regarding WSDL, a WSDL file consists of three parts: the abstract service interface, the service interface implementation, and the service location. The service interface in WSDL is called a "portType". PortTypes consist of one or more operations with input and output. The input and output are described by messages. Service messages are typed using an XML schema. The service interface implementation is described by service provider-specific extensibility elements. The service interface implementation supports the multiple service provider-specific bindings including SOAP, Java, stateless session EJB, J2EE Connector, JMS, Process, and Transform. As shown, services 23, 24, and 26 use stateless session EJB bindings 33, 34, and 36 respectively, while service 25 uses a Java binding 35. The service location is described by a service provider-specific port extensibility element.

Referring now to FIG. 2, a flow chart illustrates a method 50 of dynamically building flow services. The method 50 can include the step 51 of exposing at least a portion of a flow of a service being built to other service providers in a network and the step 52 of soliciting for modification of at least the portion of the flow by other service providers. The step of soliciting can include the alternative or optional step 53 of advertising Business Process Execution Language (BPEL) files or tags for the portion of the flow that can be modified by other service providers or the step 54 of tagging the BPEL file or tag to indicate portions of the flow which are available for reuse or modification by the other service providers. In another alternative or option, the step of soliciting can further include the step 55 of publishing the BPEL files or tags in a Universal Description, Discovery, and Integration (UDDI)-like directory. The method 50 can further include the step 56 of selectively enabling modifications of at least the portion of the flow modifiable by other service providers. Then, the method 50 can further include the step 57 of creating a new flow by incorporating the modifications into at least the portion of the flow or the step 58 of creating a new flow by using at least a portion of the flow and at least a portion of the modifications to the flow. Optionally, the method 50 can also include the step 59 of removing any solicitation for modification once the new flow is created incorporating the modifications. At step 60, the new flow (as modified) can be deployed as a new service.

As noted above, exposing the flow of the service being built to other service providers, and allowing the service providers to modify existing nodes in the flow can be accomplished by advertising BPEL files or tags. Typically a WSDL file for a service describes what function the service can perform (the abstract interface), how to interact with the service (the binding), and where the service implementation is located (location). Also, WSDL files can be published into a UDDI-like directory which is used in a different way than a typical UDDI directory. A typical UDDI directory is used by service requestors (consumers) to find services they want to use. In contrast, a UDDI-like directory can be used here to advertise what flows or portions of flows are viewable and modifiable and to solicit other service providers to modify or reuse such modifiable portions of the flow. Service providers have access to the directory and can provide the modified WSDL back to the framework or utilize the modified WSDL themselves for their own tailored business purposes. In one aspect, if the framework accepts the WSDL from the service provider, it will incorporate the WSDL in the flow under construction as modified, and optionally remove the advertisement from the directory if no further modifications are desired by the soliciting service provider. When all nodes of the flow are completed, the framework creates the service and deploys it.

Note, the UDDI (Universal Description, Discovery, and Integration) Project is an effort to define a set of specifications that will make it easier for businesses to accelerate the use of B2B and commerce over the Internet. UDDI does this by defining how companies can expose their business applications, like ecommerce, order management, inventory, marketing, and billing as Web Services that can be directly and securely defined, discovered and integrated with business applications at trading partners and customers.

The UDDI Project is based on existing Internet standards, is platform and implementation neutral, and has generated considerable momentum since its launch. Most importantly, UDDI involves the shared implementation of a Web Service based on the UDDI specifications. This Web Service, the UDDI Business Registry, is an Internet directory of businesses and the applications they have exposed as Web Services for trading partners and customers to use. Business programs will use the UDDI Business Registry to determine the specifications for programs at other companies in a manner similar to how people use Web search engines today to find websites. This automated application-to-application discovery and integration over the Internet will help eliminate many of the configuration and compatibility problems that are preventing businesses from more widely adopting B2B, despite B2B's potential for cost savings and improved efficiency.

It should be understood that the present invention can be realized in hardware, software, or a combination of hardware and software. The present invention can also be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program or application in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A computer-implemented method of dynamic creation of process flows, comprising the steps of:
   identifying at least one modifiable portion of a process flow for a web service built by a service provider and exposing the at least one modifiable portion to other service providers in a network, wherein said process flow comprises one or more activities for completing at least one task for the web service;
   soliciting for modifications of the at least one modifiable portion of the process flow by the other service providers;
   receiving one or more modifications from said other service providers for said at least one modifiable portion;
   selectively enabling said received modifications for said at least one modifiable portion;
   creating a new process flow for use by said service provider by incorporating said modifications into said exposed at least one modifiable portion of the process flow; and
   wherein the soliciting step comprises the step of advertising Business Process Execution Language (BPEL) files for the exposed portion of the flow that can be modified by the other service providers; wherein the method further comprises the step of tagging the BPEL files to indicate said exposed portions of the flow which are available for reuse or modifiable by the other service providers; and wherein the soliciting step comprises the step of publishing the BPEL files in a Universal Description, Discovery, and Integration (UDDI)-like directory.

2. The method of claim 1, wherein the method further comprises the step removing any identification of said modifiable portions once the new flow is created.

3. The method of claim 1, wherein the method further comprises the step of deploying the new flow as a new web service.

4. A system for dynamically creating a service flow using a network of service providers, comprising:
   a processor coupled to the network of service providers, wherein the processor is programmed to:
   identify at least one modifiable portion of a process flow for a web service built by a service provider and exposing the at least one modifiable portion to other service providers in a network, wherein said process flow comprises one or more activities for completing at least one task for the web service;
   solicit for modifications of the at least one modifiable portion of the process flow by the other service providers;
   receive one or more modifications from said other service providers for said at least one modifiable portion;
   selectively enable said received modifications for said at least one modifiable portion;
   create a new process flow for use by said service provider by incorporating said modifications into said exposed at least one modifiable portion of the process flow; and
   wherein the soliciting step comprises the step of advertising Business Process Execution Language (BPEL) files for the exposed portion of the flow that can be modified by the other service providers; wherein the method further comprises the step of tagging the BPEL files to indicate said exposed portions of the flow which are available for reuse or modifiable by the other service providers; and wherein the soliciting step comprises the step of publishing the BPEL files in a Universal Description, Discovery, and Integration (UDDI)-like directory.

5. The system of claim 4, further comprising the processor further programmed to remove any identification of said modifiable portions once the new flow is created.

6. the system of claim 4, further comprising the processor further programmed to deploy the new flow as a new web service.

* * * * *

UNITED STATES PATENT AND TRADEMARK OFFICE
CERTIFICATE OF CORRECTION

PATENT NO. : 7,606,803 B2  Page 1 of 1
APPLICATION NO. : 11/023930
DATED : October 20, 2009
INVENTOR(S) : Bou-Ghannam et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 476 days.

Signed and Sealed this

Twelfth Day of October, 2010

David J. Kappos
*Director of the United States Patent and Trademark Office*